(12) United States Patent
Kamiyama et al.

(10) Patent No.: US 7,451,783 B2
(45) Date of Patent: Nov. 18, 2008

(54) POSITION ADJUSTING SPACER AND METHOD FOR ADJUSTING THE POSITION OF A REHABILITATING PIPE USING SUCH

(75) Inventors: Takao Kamiyama, Kanagawa-ken (JP); Koji Kaneta, Kanagawa-ken (JP)

(73) Assignee: Shonan Gosei-Jushi Seisakusho K.K., Kanagawa-ken (JP)

( * ) Notice: Subject to any disclaimer, the term of this patent is extended or adjusted under 35 U.S.C. 154(b) by 753 days.

(21) Appl. No.: 11/023,966

(22) Filed: Dec. 27, 2004

(65) Prior Publication Data
US 2005/0236058 A1 Oct. 27, 2005

Related U.S. Application Data

(60) Provisional application No. 60/565,232, filed on Apr. 23, 2004.

(51) Int. Cl.
 *F16L 55/16* (2006.01)
(52) U.S. Cl. .................... 138/98; 138/97; 138/148; 138/112; 138/113
(58) Field of Classification Search .......... 138/89, 138/90, 97, 98, 148, 112, 113, 108
See application file for complete search history.

(56) References Cited

U.S. PATENT DOCUMENTS

| | | | | |
|---|---|---|---|---|
| 1,075,842 A | * | 10/1913 | McCutchen | ........... 166/192 |
| 4,498,811 A | * | 2/1985 | Fern et al. | ........... 405/168.1 |
| 6,018,914 A | | 2/2000 | Kamiyama et al. | |
| 2003/0136455 A1 | | 7/2003 | Kamiyama et al. | |
| 2004/0108009 A1 | | 6/2004 | Kamiyama et al. | |

FOREIGN PATENT DOCUMENTS

JP 2003286742 10/2003

* cited by examiner

*Primary Examiner*—Patrick F Brinson
(74) *Attorney, Agent, or Firm*—Klarquist Sparkman, LLP

(57) ABSTRACT

A spacer is constituted by overlapping on a first wedge-shaped member, whose upper surface is inclined at a prescribed angle, a second wedge-shaped member, whose lower surface is inclined at the same angle. This spacer is inserted in the gap between an inner wall surface of an existing pipe and the outer periphery of a rehabilitating pipe. Latching teeth are formed in the inclined surfaces of the first and second wedge-shaped members so that, when pressing the second wedge-shaped member to move it toward the first wedge-shaped member in the insertion direction, it cannot move in the direction the reverse of the insertion direction. Upon moving the second wedge-shaped member to the respective latch positions, the overall height of the spacer is successively increased in steps at a fine pitch, thus enabling the adjustment of the position of the rehabilitating pipe with respect to the existing pipe to be performed simply.

6 Claims, 17 Drawing Sheets

POSITION ADJUSTING SPACER AND METHOD FOR ADJUSTING THE POSITION OF A REHABILITATING PIPE USING SUCH

CROSS REFERENCE TO RELATED APPLICATIONS

This application claims the benefit of U.S. Provisional Application No. 60/565,232, filed Apr. 23, 2004, which application is incorporated herein in its entirety.

BACKGROUND OF THE INVENTION

1. Field of the Invention

The present invention relates to a spacer inserted in a gap between an existing pipe and a rehabilitating pipe to adjust the position of the rehabilitating pipe, and a method for adjusting the position of a rehabilitating pipe using such a spacer.

2. Description of the Prior Art

A method for rehabilitating an existing pipe such a sewer pipe is known in which a rehabilitating pipe is laid inside the existing pipe and a compound pipe is constructed by filling the gap between the outer periphery of the rehabilitating pipe and the inner wall surface of the existing pipe with a filler and then hardening the filler. This existing pipe rehabilitating work normally requires the fixing of the rehabilitating pipe by adjusting the position of the rehabilitating pipe in the upper, lower, left, and right directions inside the existing pipe to a position slightly offset downward from the position concentric with the existing pipe so that the lower end of the outer periphery thereof contacts the bottom of the existing pipe.

The purpose of this is to ensure the flow of fluid inside the existing pipe by lowering the bottom of the rehabilitating pipe so that it approaches the bottom of the existing pipe as much as possible, and to thicken and strengthen the filler on the upper side because the majority of damage to existing pipes occurs on the upper side portion thereof. In this connection, the abovementioned position adjustment is needed in order to press the rehabilitating pipe downward because the rehabilitating pipe is made of a plastic material having a specific gravity lower than the filler, and therefore unfortunately floats above the filler.

Conventionally, the position of a rehabilitating pipe is adjusted utilizing a method wherein a squared member fabricated to the required height (thickness) is interposed as a spacer in the gap between the rehabilitating pipe outer periphery and the existing pipe inner wall surface. In addition, Japanese Patent Laid Open Publication No. 2003-286742 discloses a method of adjusting the position of the rehabilitating pipe, wherein a bolt that constitutes a spacer is screwed to a block (segment) that constitutes the rehabilitating pipe so that the bolt can advance or retreat in the direction protruding from the rehabilitating pipe outer periphery and in the reverse direction thereof and is screwed to increase or decrease the length at which it protrudes from the rehabilitating pipe outer periphery.

Nevertheless, in the abovementioned method that uses a squared member as a spacer, several types of squared members must be prepared having height dimensions in accordance with the dimension of the gap between the rehabilitating pipe outer periphery and the existing pipe inner wall. In addition, in the case of the spacer comprising a bolt as mentioned above, a screw hole must be fabricated for the bolt into the block that constitutes the rehabilitating pipe, and it is moreover necessary to plug that screw hole in a downstream process. Either way, it is problematic that adjusting the position of the rehabilitating pipe requires labor, and that position adjustment cannot be performed simply and in a short time period.

An object of the present invention is therefore to provide a position adjusting spacer that can appropriately adjust the position of a rehabilitating pipe inside an existing pipe during existing pipe rehabilitating work, and also to provide a position adjusting method that utilizes such a spacer.

SUMMARY OF THE INVENTION

A spacer according to the invention is inserted in a gap between an existing pipe and a rehabilitating pipe to adjust the position of the rehabilitating pipe with respect to the existing pipe and comprises a first wedge-shaped member that is inclined at a prescribed angle; a second wedge-shaped member that is inclined at an angle the same as the inclination angle of the first wedge-shaped member and overlaps the first wedge-shaped member aligned to the inclined angle surface; and latching means that makes the second wedge-shaped member movable toward the first wedge-shaped member in the insertion direction and latches at a plurality of latch positions so that it cannot move in the reverse direction. The second wedge-shaped member is successively moved to one of the latch positions to stepwise increase the overall height of the spacer.

A method for adjusting the position of a rehabilitating pipe according to the invention utilizes such a spacer comprising the first and second wedge-shaped members. The entire spacer is first inserted in the gap between the existing pipe and the rehabilitating pipe in a state wherein the second wedge-shaped member overlaps the first wedge-shaped member. The second wedge-shaped member is then pressed in the insertion direction to move it toward the first wedge-shaped member to successively increase the overall height of the spacer stepwise to a desired height for positional adjustment of the rehabilitating pipe with respect to the existing pipe.

The present invention can perform positioning adjustment by increasing the overall height of a spacer to a desired height using an extremely simple procedure. That is, the second wedge-shaped member is only moved in the insertion direction with respect to the first wedge-shaped member. This allows positional adjustment to be performed very simply in a short time period. Particularly in existing pipe rehabilitating work, it is ideal to adjust the position of the rehabilitating pipe in the vertical direction with respect to the existing pipe; such positioning adjustment is performed simply and in a short time period, and there is no need to perform any particular procedures in the downstream process. Further, the spacer can be made simply and at low cost because the spacer comprises just two types of members, i.e., the first and second wedge-shaped members.

Further features of the invention, its nature and various advantages will be more apparent from the accompanying drawings and following detailed description of the invention.

DESCRIPTION OF THE PREFERRED EMBODIMENTS

An embodiment will now be described that is related to adjusting the position of a rehabilitating pipe inside an existing pipe, such as a sewer pipe, in the existing pipe rehabilitating work. Although both the existing pipe and the rehabilitating pipe are described as cylindrical pipes in this embodiment, the present invention is also applicable for positioning adjustment even in the case wherein the cross-sectional shape of the prospective pipes orthogonal to the pipe longitudinal direction is non-circular, e.g., rectangular. In addition, the present invention is also applicable in the case wherein the cross-sectional shape of the rehabilitating pipe is not a closed shape, as in a literal pipe, but rather is an open shape on one side, e.g., a horseshoe shape or a semicircular shape.

Figure 11:
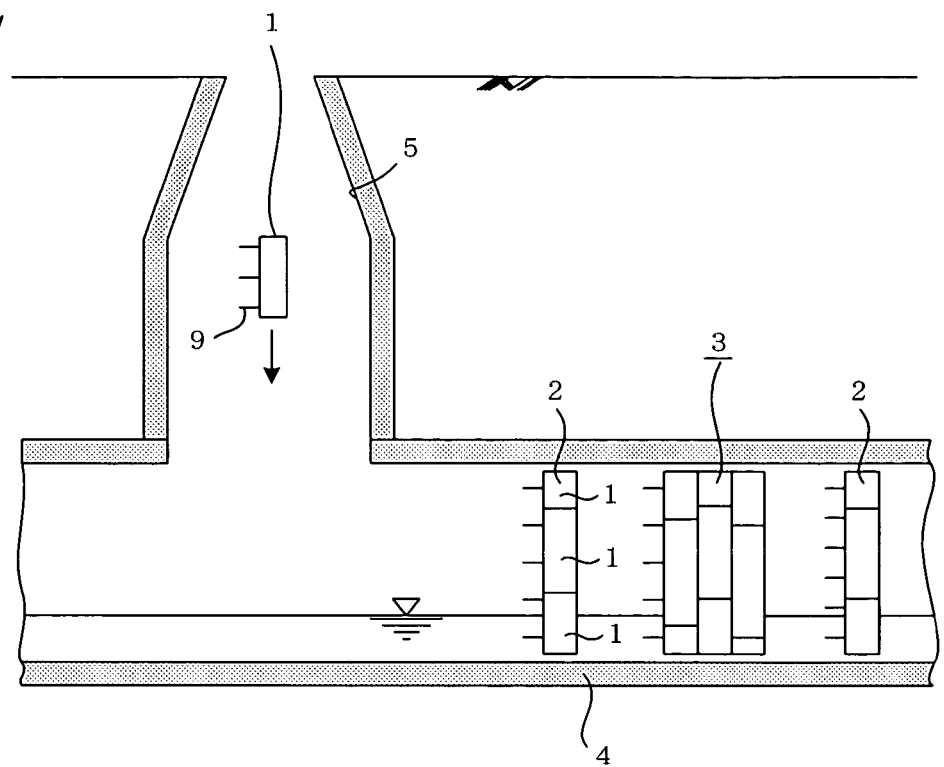
FIG. 11 is a cross-sectional view that shows an aspect of laying a rehabilitating pipe by carrying a segment into the existing pipe and coupling pipe units.
Figure 12:
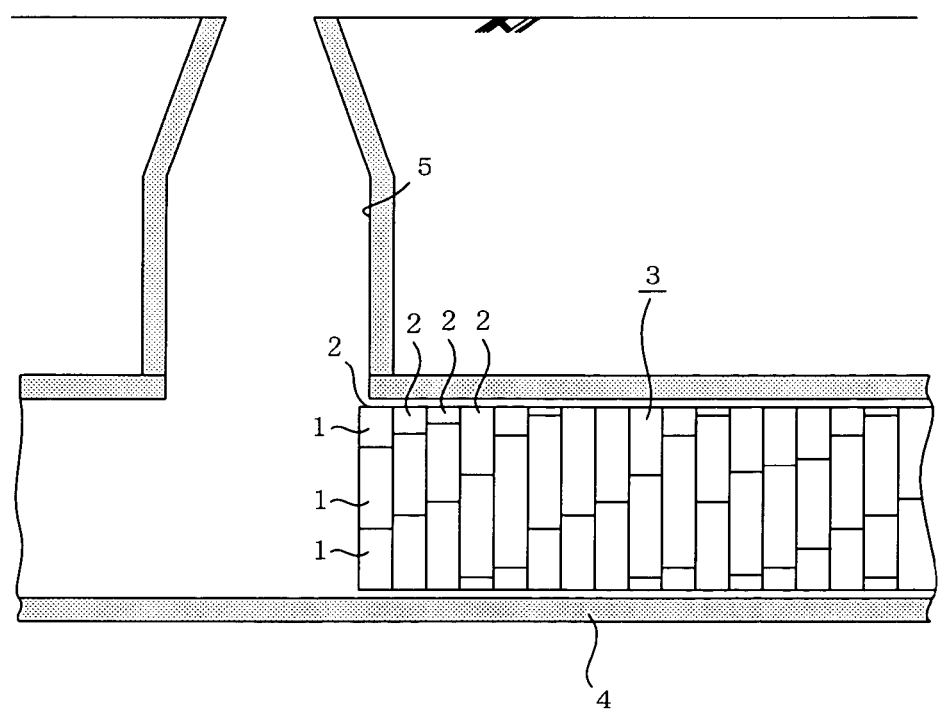
FIG. 12 is a cross-sectional view that shows an aspect wherein the entire length of the rehabilitating pipe is laid.

In the existing pipe rehabilitating work of the embodiment, as shown in FIG. 11 and FIG. 12, a rehabilitating pipe 3 whose outer diameter is slightly less than the inner diameter of an existing pipe 4, such as a sewer pipe, is laid inside the existing pipe 4. That laying is performed by successively coupling in the longitudinal direction a ring-shaped pipe unit 2, which is formed by coupling a plurality of segments 1 in the circumferential direction.

Figure 1:
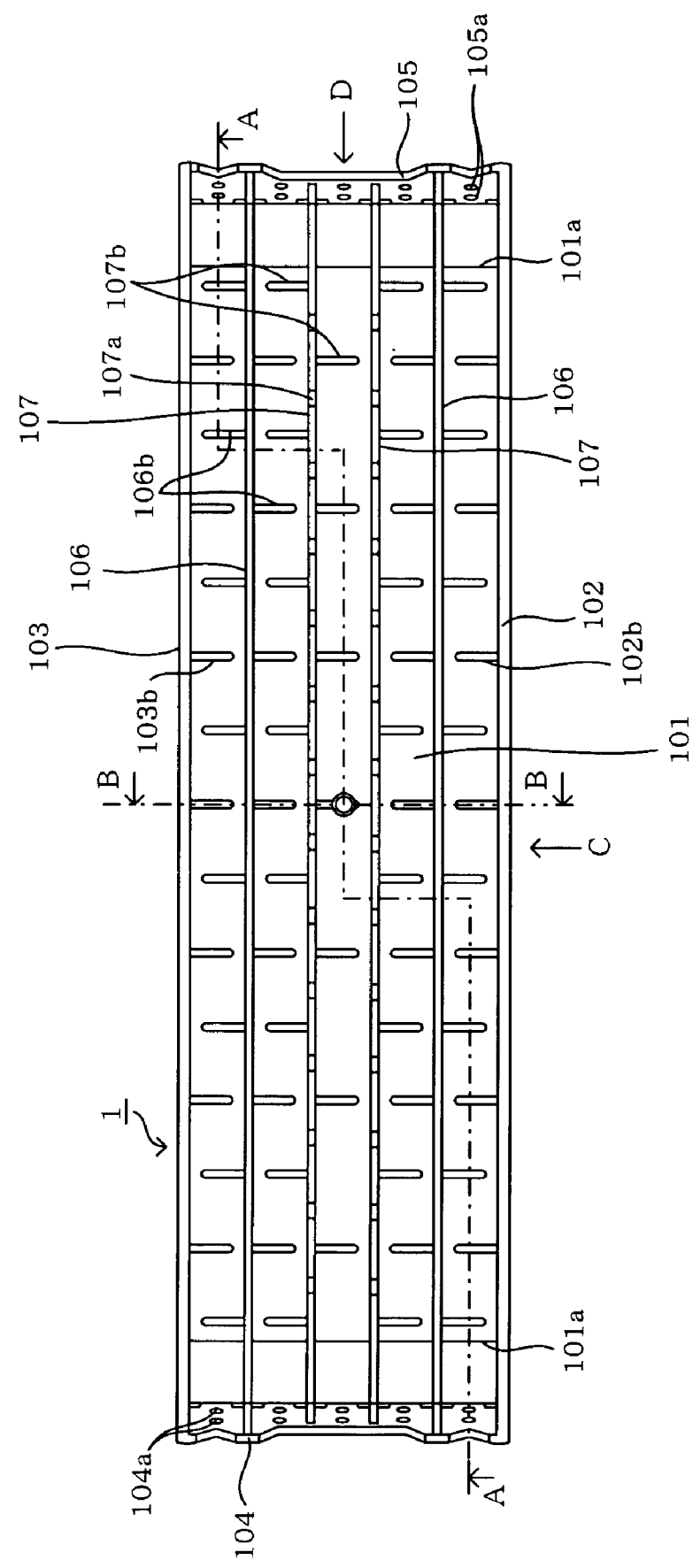
FIG. 1 is a top view that shows the structure of the segment that constitutes the rehabilitating pipe assembled inside the existing pipe in the existing pipe rehabilitating work of the present embodiment in the present invention.
Figure 2:
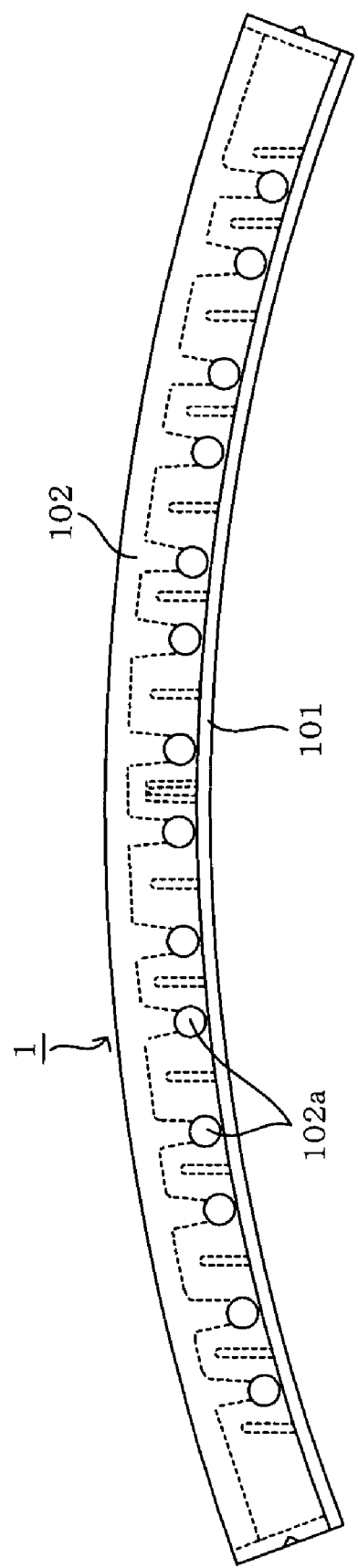
FIG. 2 is a side view seen from the arrow C direction in FIG. 1.
Figure 3:
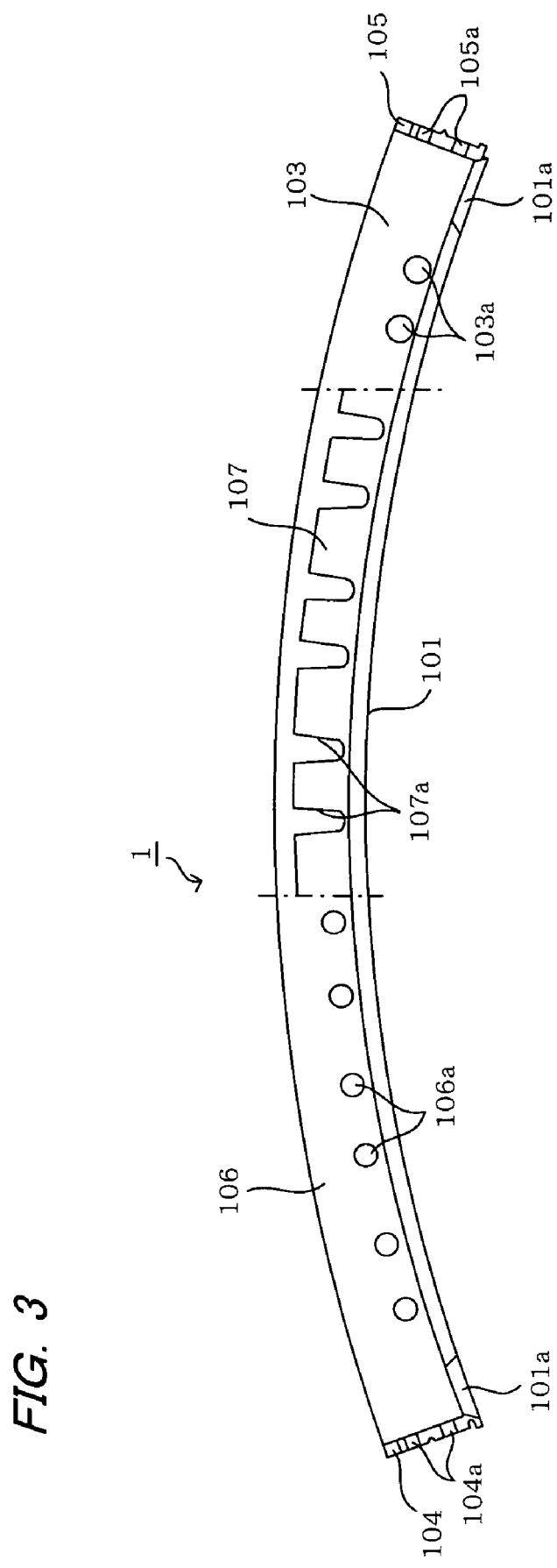
FIG. 3 is a cross-sectional view taken along the A-A line in FIG. 1.
Figure 4:
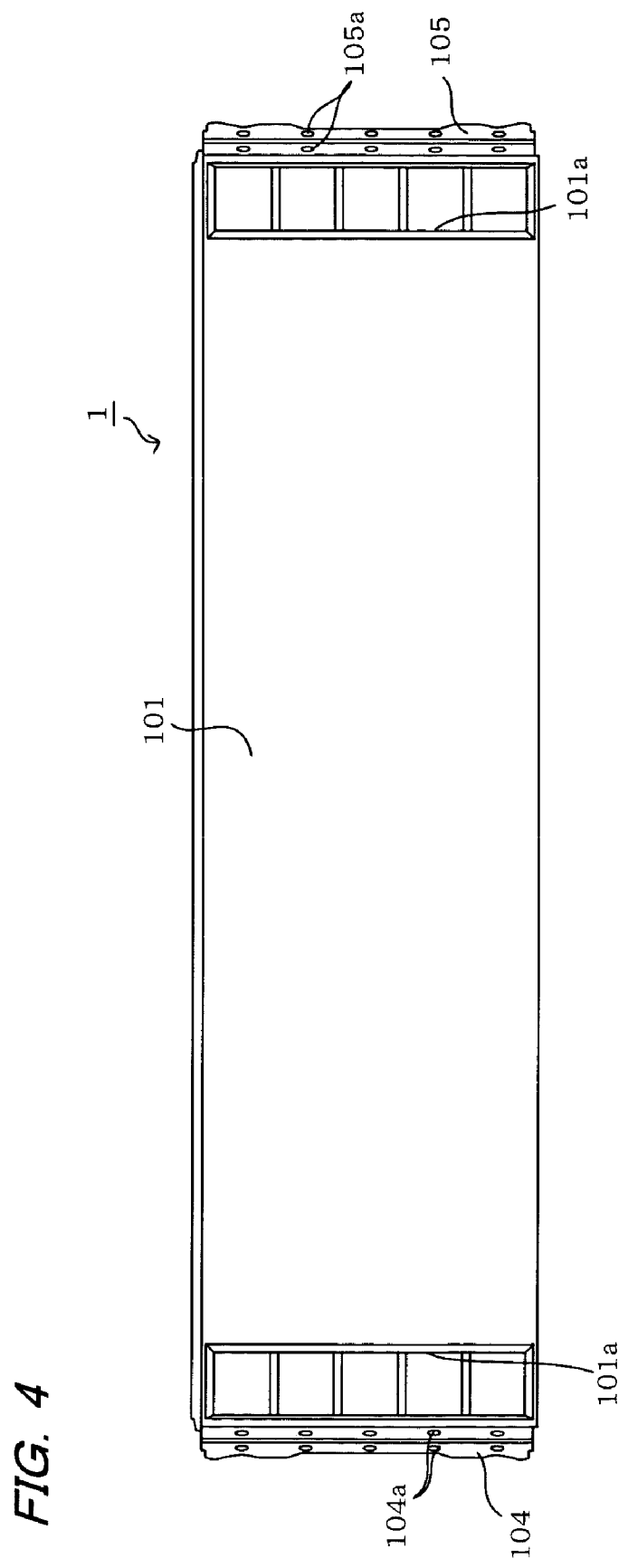
FIG. 4 is a bottom view of the segment.

FIG. 1 shows the entire upper surface of this segment 1. FIG. 2 shows the side surface viewed from the arrow C direction in FIG. 1. FIG. 3 is a cross-section taken along the A-A line in FIG. 1. FIG. 4 shows the lower surface of the segment 1.

The segment 1 corresponds to one of the plurality of parts of the pipe unit 2 equally divided in the circumferential direction thereof, e.g., five equal parts, and is integrally formed from a transparent plastic. The segment 1 comprises an inner plate 101 having a prescribed width and curved in an arc shape at a prescribed angle, e.g., 72 degrees; side plates 102 and 103 provided upright outwardly along both side edges of the arc; end plates 104 and 105 provided upright outwardly along both end edges of the arc; and two each of reinforcing plates 106 having high backs and reinforcing plates 107 having low backs, each provided upright outwardly on the inner plate 1.

Two openings 101*a* are formed at both end parts of the inner plate 101. The purpose of this is to perform the work, from the inner side, of mutually fastening the segments 1 with the coupling bolts 6 (refer to FIG. 8 and FIG. 9).

Figure 10:
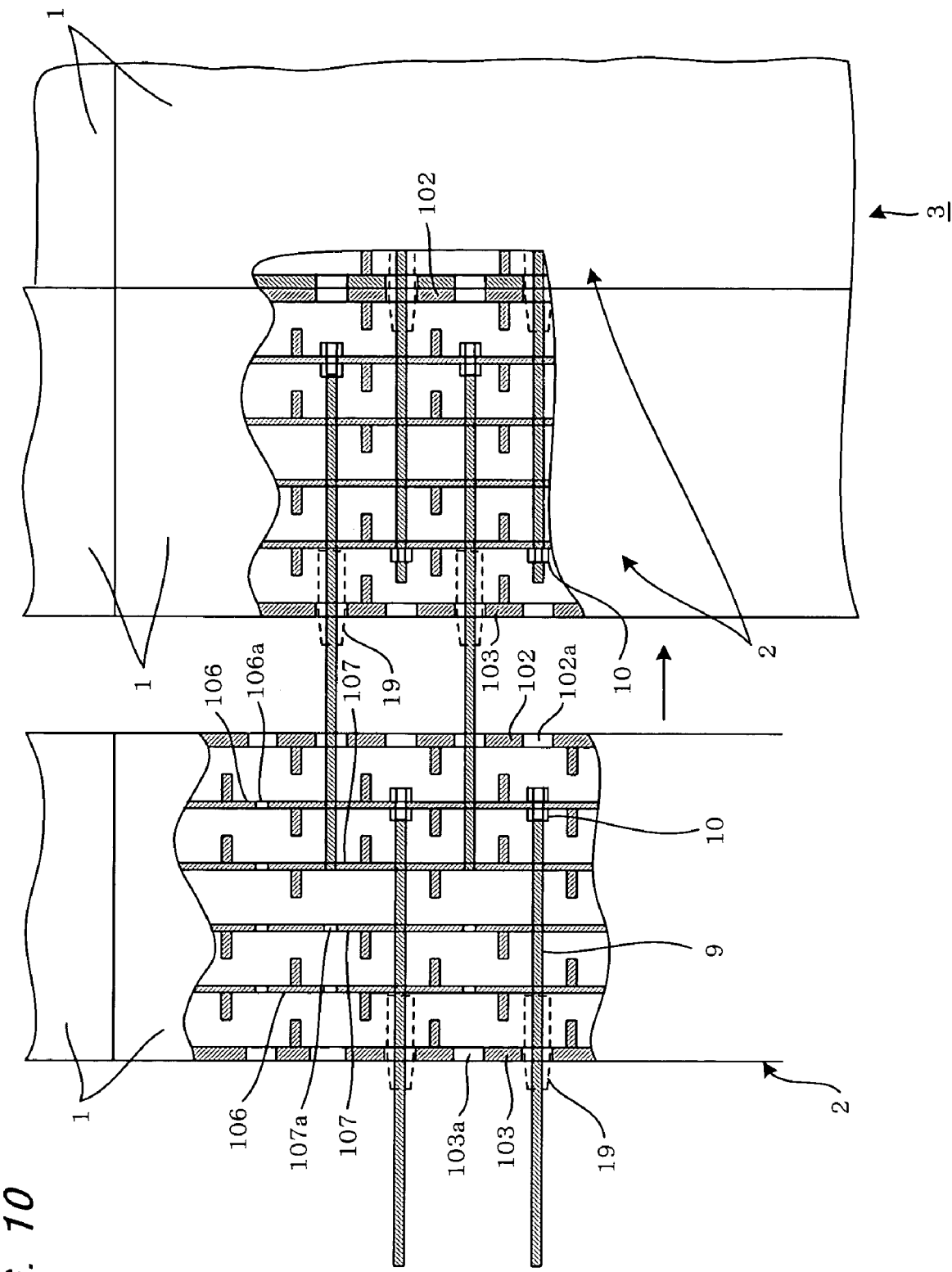
FIG. 10 is a partially broken cross-sectional view that explains the method of mutually coupling pipe units that are constituted by the coupling of segments.

A plurality (herein, 14) of bolt through holes 102*a* and 103*a* is respectively formed in the side plates 102 and 103 at prescribed intervals in the circumferential direction of the abovementioned arc. The diameter thereof is slightly smaller than the diameter of a nut 10 or the head of a bolt 9 for mutually coupling the pipe unit 2 in the longitudinal direction, as shown in FIG. 10.

Figure 7:
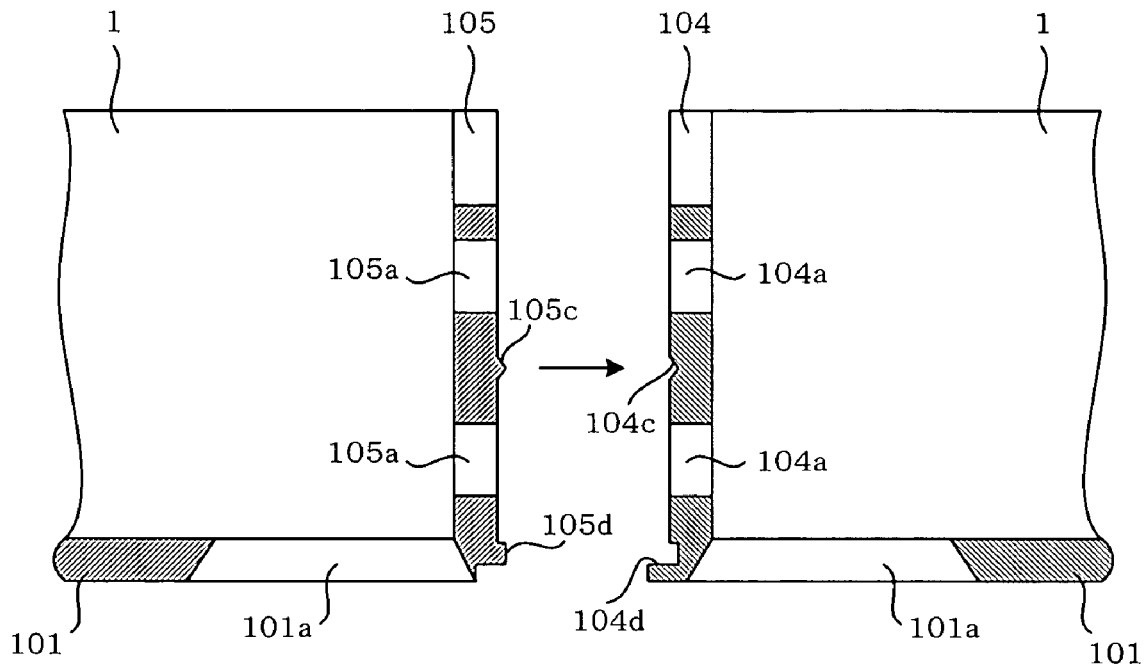
FIG. 7 is a longitudinal side view that explains the method of mutually coupling the segments.

To insert the coupling bolts 6 (refer to FIG. 8 and FIG. 9) for mutually coupling the segments 1 in the circumferential direction of the existing pipe, bolt through holes 104*a* and 105*a* are formed in each of the end plates 104 and 105. In addition, as shown in FIG. 7, a V-shaped groove 104*c* is formed at the central part on the outside surface of the end plate 104; and a mating part 104*d*, comprising a groove on the upper side and a protrusion on the lower side, is formed extending in the latitudinal direction at the lower end part thereof. In addition, a protruding part 105*c* and a mating part 105*d*, each having a shape respectively the opposite of the groove 104*c* and the mating part 104*d*, are formed at corresponding positions on the outside surface of the end plate 105.

The reinforcing plates 106 and 107 reinforce the mechanical strength of the entire segment 1, and therein are formed a plurality of bolt through holes 106*a* and notched parts 107*a* for inserting bolts 9 (refer to FIG. 10) for coupling the pipe units 2 with their positions respectively made to correspond to those of the bolt through holes 102*a*, and 103*a* of the side plates 102 and 103. The diameter of the bolt through hole 106*a* is just slightly greater than the diameter of the shaft part of the bolt 9, but is less than the diameter of the head of the bolt 9 or the diameter of the nut 10.

Figure 5:
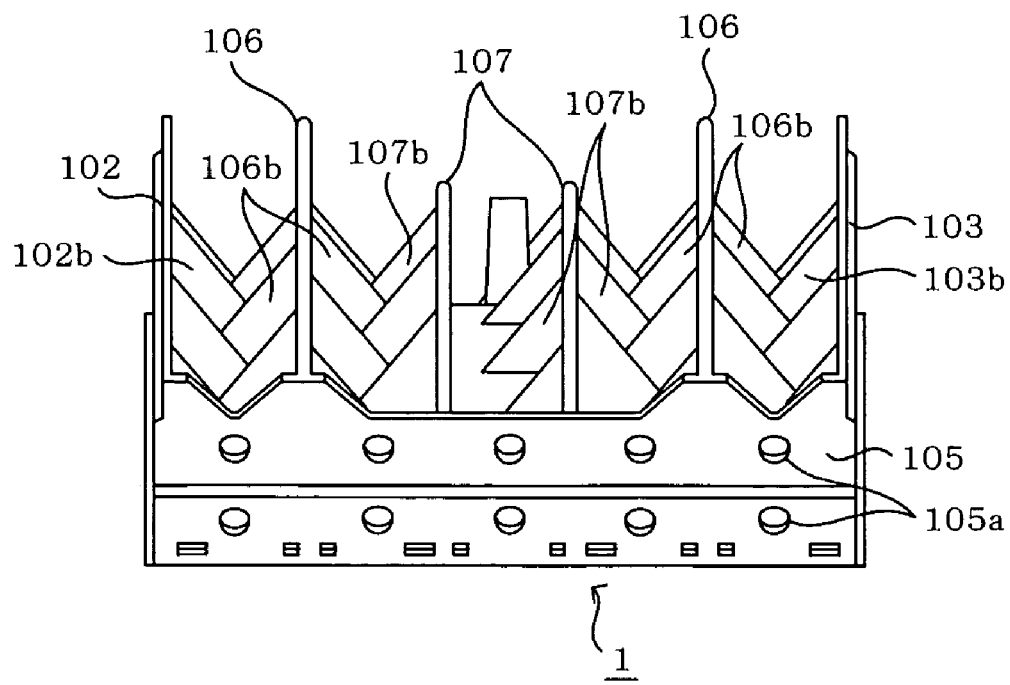
FIG. 5 is an auxiliary view seen from the arrow D direction in FIG. 1.

In addition, to prevent deformation of the inside surfaces of the side plates 102 and 103 and both side surfaces of the reinforcing plates 106 and 107, a plurality of laterally overhanging, small protruding plates 102*b*, 103*b*, 106*b* and 107*b* is formed on the inside surfaces of the side plates 102 and 103 and on both side surfaces of the reinforcing plates 106 and 107 (only one side surface of one of the reinforcing plates 107) so that they respectively alternate at positions between adjoining bolt through holes 102*a*, 103*a*, 106*a* and the notched part 107*a*. As shown in FIG. 5 (auxiliary view in the arrow D direction in FIG. 1) and FIG. 6 (cross-sectional view taken along the B-B line in FIG. 1), these are formed as right triangles, with their bases continuous with the inner plate 101.

These are formed in such a shape in order to avoid rebars in cases wherein rebars (not shown) are laid circularly in the circumferential direction along the inner wall surface of the existing pipe 4 to strengthen a compound pipe comprising the existing pipe 4, the rehabilitating pipe 3, and the filler.

Figure 6:
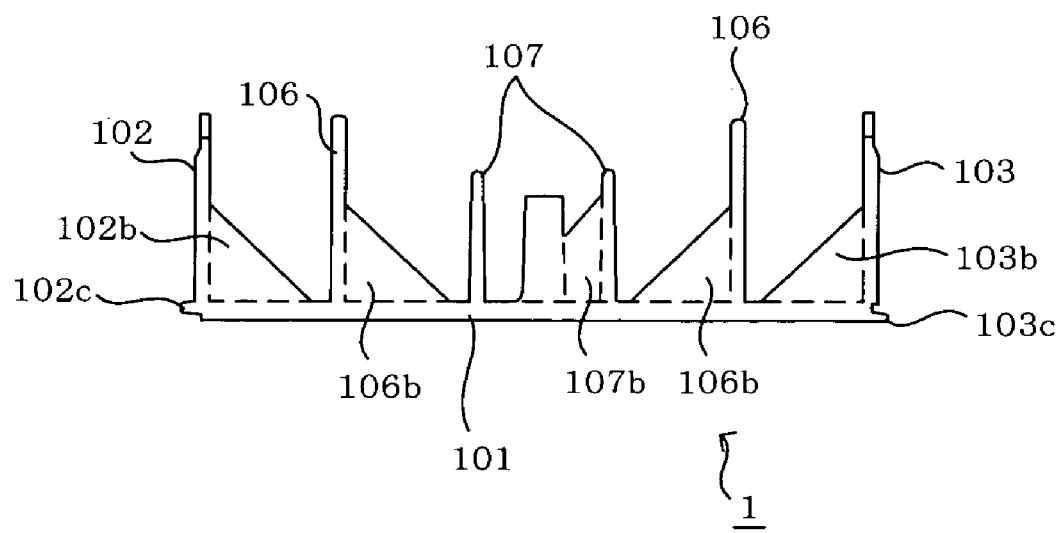
FIG. 6 is a cross-sectional view taken along the B-B line in FIG. 1.

In addition, as shown in FIG. 6, along the side edge of the inner plate 101 and across the entire length thereof, a mating part 102c is formed at the lower end part of the outside surface of the side plate 102, wherein the upper side is a groove and the lower side is a protruding part; and a mating part 103c, having a shape the reverse of the mating part 102c, is formed at the lower end part of the outside surface of a side plate 103.

In the existing pipe rehabilitating work that uses a segment 1 comprising the above construction, the segment 1 is first carried into a manhole 5 in communication with the existing pipe 4, as shown in FIG. 11, but coupling bolts 9 of the pipe unit 2 are fixed beforehand to the segment 1, as shown in FIG. 10.

To fix the bolt 9, the bolt 9 is first inserted from the bolt through hole 102a of one of the side plates 102 and 103, e.g., the side plate 102, of the segment 1, inserted through the bolt through holes 106a of the reinforcing plates 106 and 107, the notched part 107a and the bolt through holes 103a of the side plate 103. The head of the bolt 9 is then inserted to a position at which it contacts the reinforcing plate 106 on the side plate 102 side. Further, the bolt 9 is fixed by screwing the nut 10 from the tip side of the bolt 9 protruding outward from the side plate 103, tightening the nut 10 to a position at which it contacts the reinforcing plate 106 on the side plate 102 side, and by further inserting a cylindrical-shaped positioning member 19 from the tip side of the bolt 9 and inserting it to a position at which it contacts the reinforcing plate 106 on the side plate 103 side. The positioning member 19 positions the bolt 9 concentric with the bolt through hole 103a and mutually aligns positions of the bolt through holes 102a and 103a of the coupled pipe units 2, as described later.

Furthermore, the number of bolts 9 that are fixed is less than half the number of the bolt through holes 102a and the like, and a bolt 9 is fixed for each bolt through hole or every plural number thereof. In addition, the length of the bolt 9 is set so that the length of the portion of the fixed bolt 9 protruding from the side plate 103 is slightly less than the width of the segment 1 (from the outside surface of the side plate 102 to the outside surface of the side plate 103).

Figure 8:
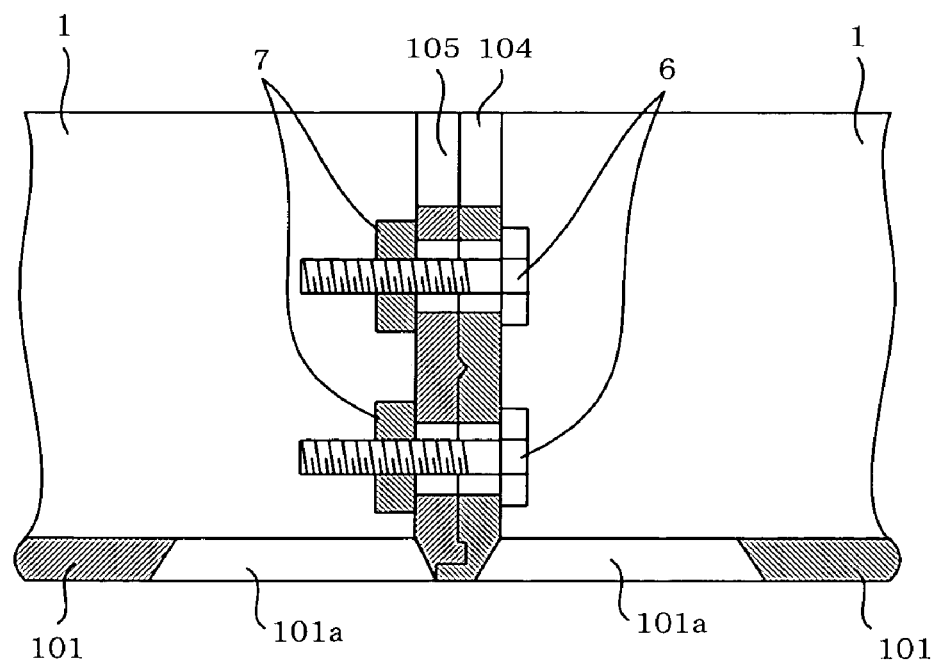
FIG. 8 is a longitudinal side view that shows the state wherein the segments are mutually coupled.
Figure 9:
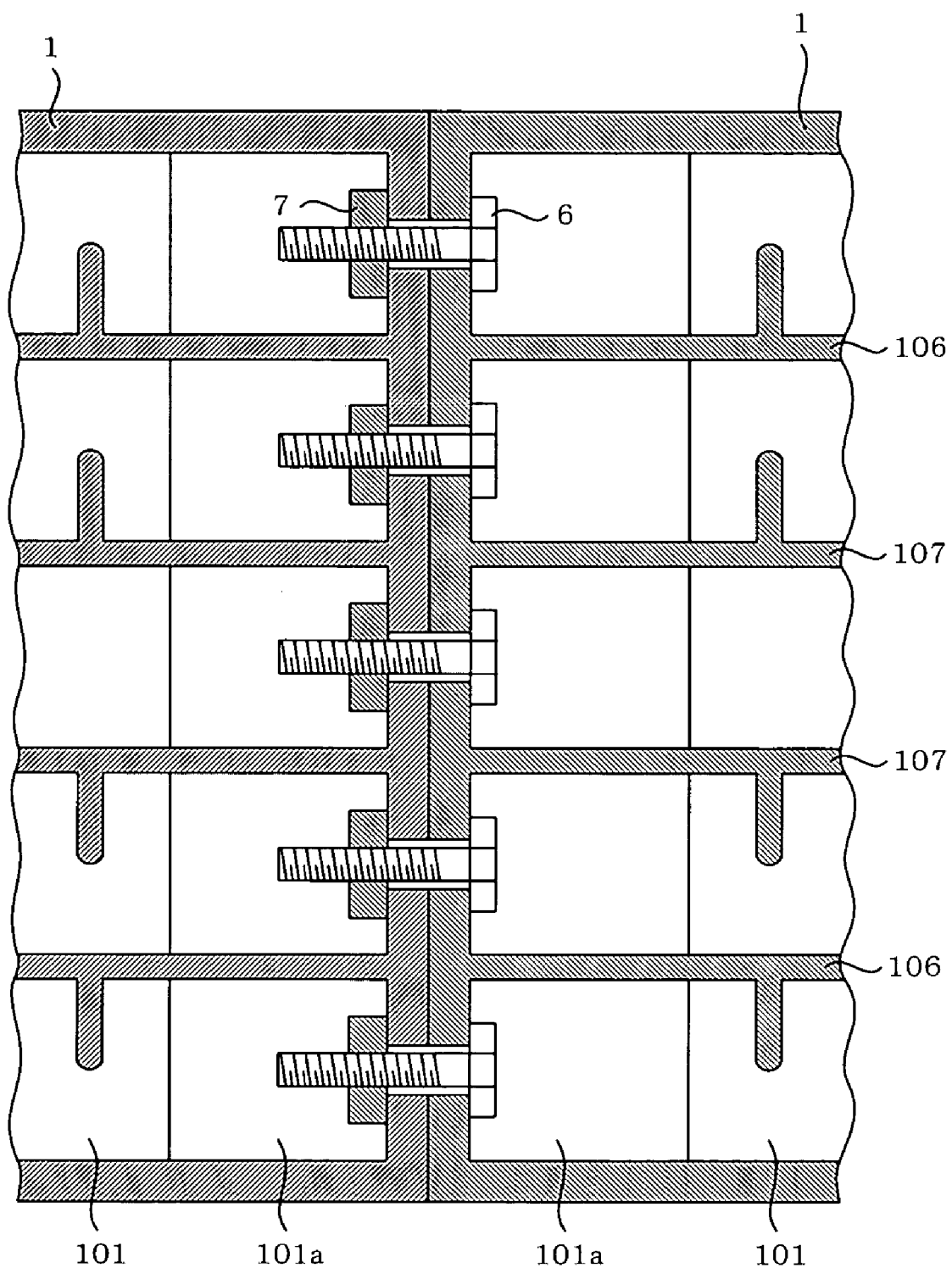
FIG. 9 is a latitudinal plan view that shows the state wherein the segments are mutually coupled.

Thus, a plurality of segments 1 with bolts 9 fixed is coupled in the circumferential direction, as shown in FIG. 7 through FIG. 9. For this, the protruding part 105c and the mating part 105d of the end plate 105 of the segment 1 on the left side in FIG. 7 is first mated to the groove 104c and the mating part 104d of the end plate 104 of the segment 1 on the right side thereof, thus mutually sealing the end plates 104 and 105. Next, the segments 1 and 1 are mutually coupled by inserting the bolt 6, as shown in FIG. 8 and FIG. 9, from the opening 101a of the inner plate 101 of the right-side segment 1 through bolt through holes 104a and 105a of the end plates 104 and 105, inserting a nut 7 from the opening 101a of the left-side segment 1, screwing it to the bolt 6, and tightening it to the end plate 105. After coupling, a cover (not shown) for plugging the opening 101a is fitted to the opening 101a and fixed by, for example, making contact with an engaging mechanism (not shown).

Thus, a plurality of segments 1 is successively coupled in the circumferential direction, thus assembling the pipe unit 2, as shown in FIG. 11. Further, successively assembled pipe units 2 are carried in as far as the rehabilitating position inside the existing pipe 4, and successively coupled in the longitudinal direction, thus assembling and laying down a rehabilitating pipe 3.

FIG. 10 shows an aspect wherein pipe units 2 are mutually coupled by bolts 9. To couple the left-side pipe unit 2 to the right-side pipe unit 2, the bolt 9 protruding from the side plate 103 of the segment 1 of the right-side pipe unit 2 is first inserted through the side plate 102 of the part wherein the bolt 9 of the segment 1 of the left-side pipe unit 2 is not fixed. The bolt 9 is further inserted through the bolt through holes 102a and 106a of the reinforcing plates 106 and 107 and through the notched part 107a with the positioning member 19 into the bolt through hole 102a. The side plate 102 of the segment 1 of the left-side pipe unit 2 is then pressed against the side plate 103 of the segment 1 of the right-side pipe unit 2. In this situation, the mating part 102c shown in FIG. 6 is mated to the mating part 103c to thereby seal the side plates 102 and 103. The tip part of the bolt 9 protruding from the segment 1 of the right-side pipe unit 2 reaches the vicinity on the inner side of the side plate 103 of the segment 1 of the left-side pipe unit 2. The left-side pipe unit 2 is then fixed to and coupled to the right-side pipe unit 2 by screwing the nut 10 from the bolt through hole 103a to the tip part of the bolt 9, and fastening it to the reinforcing plate 106 adjacent to the side plate 103. Thus, as shown in FIG. 11 through FIG. 12, the pipe units 2 are successively coupled in the longitudinal direction to lay a rehabilitating pipe 3 within the existing pipe 4.

The laid rehabilitating pipe 3 comprises a plastic material and has a low specific gravity and therefore floats on the filler, as described previously. It is therefore necessary to press the rehabilitating pipe 3 downward, and adjust its position so that it is offset slightly downward from the position concentric with the existing pipe 4 so that the lower end of the outer perimeter thereof contacts the bottom of the existing pipe 4.

Figure 13:
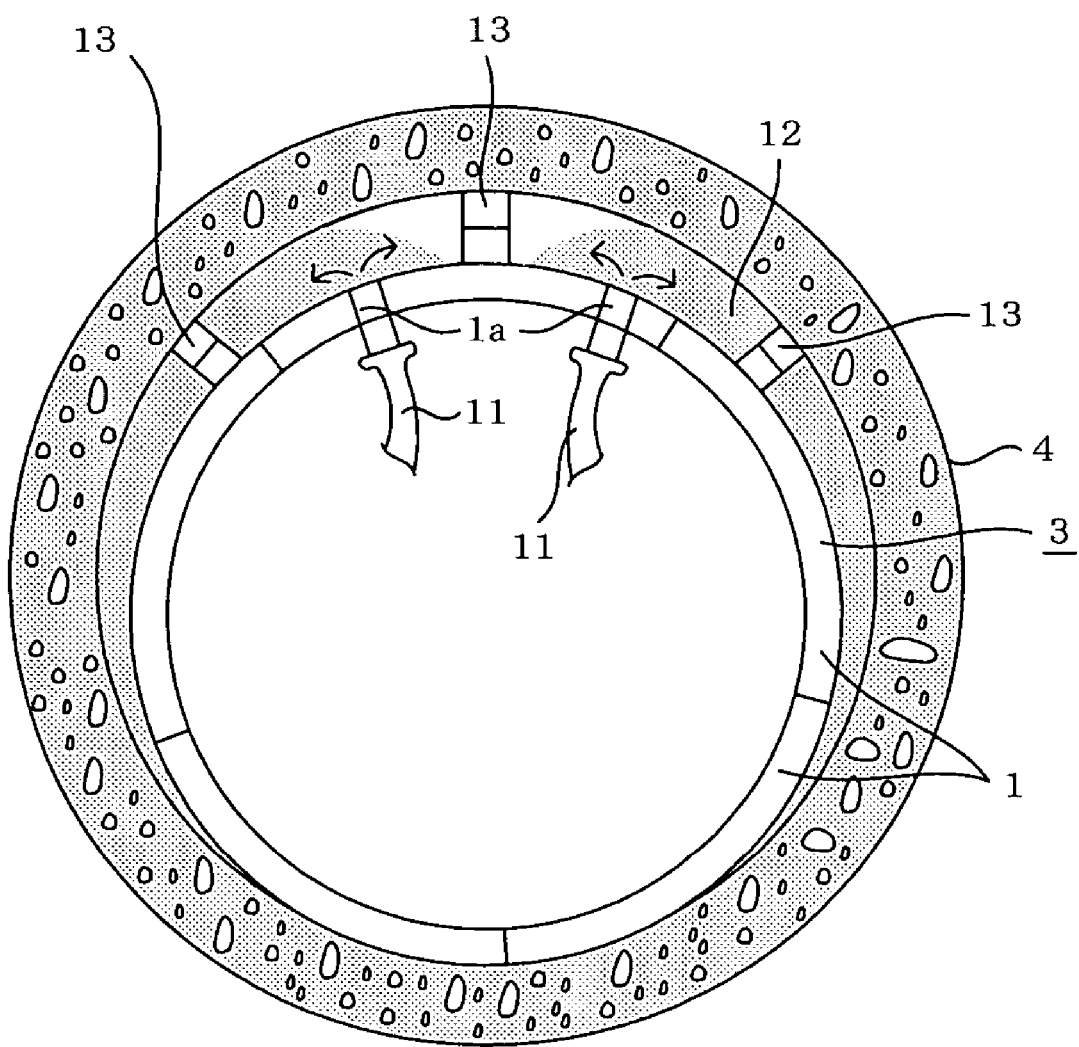
FIG. 13 is a cross-sectional view that shows an aspect wherein filler is poured into the space of the gap between the outer periphery of the laid rehabilitating pipe and the inner wall surface of the existing pipe.

Consequently, every time a rehabilitating pipe 3 is assembled to a prescribed length (for example, approximately 1 m), position adjustment is performed by inserting a spacer 13, as shown in FIG. 13, at a plurality of locations between the inner wall surface of the existing pipe 4 and the upper side outer periphery of the rehabilitating pipe 3.

Figure 14:
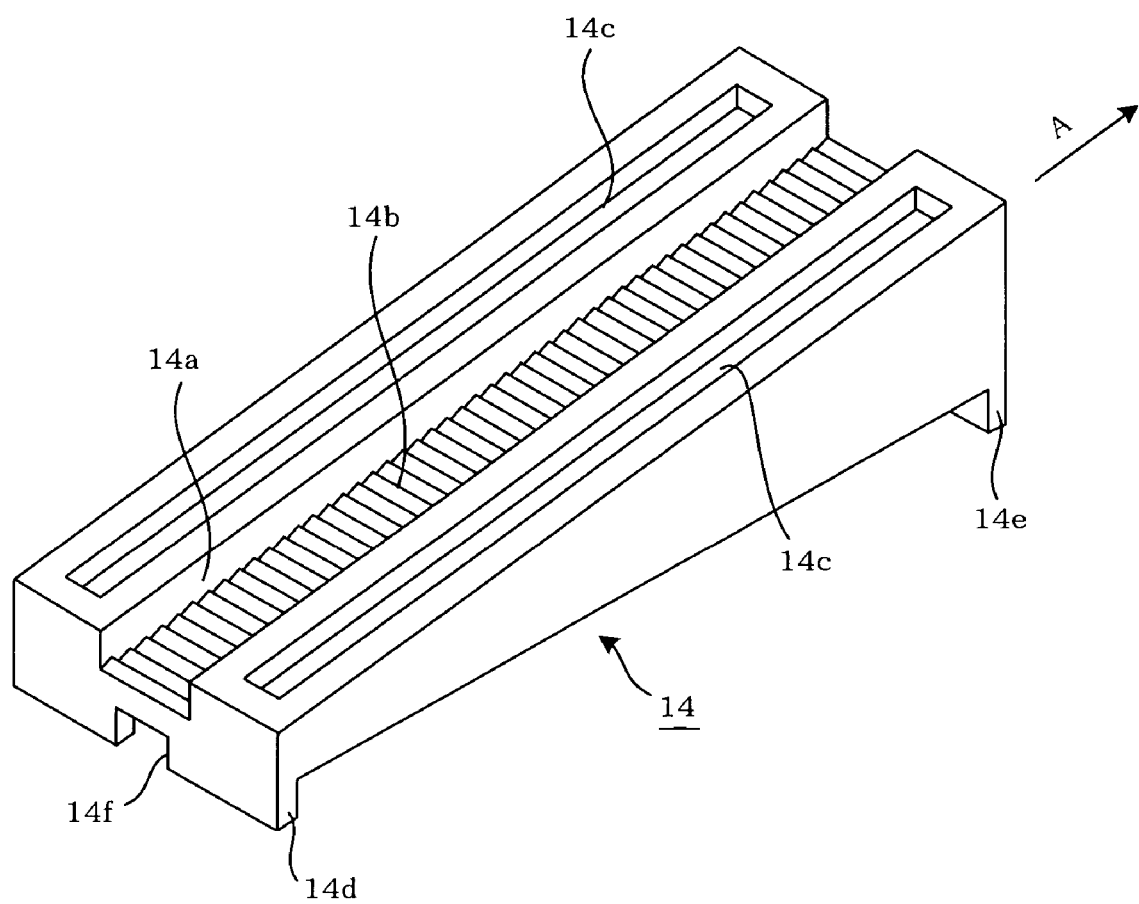
FIG. 14 is a perspective view that shows the structure of the first wedge-shaped member that constitutes the spacer for adjusting the position of the rehabilitating pipe.
Figure 15:
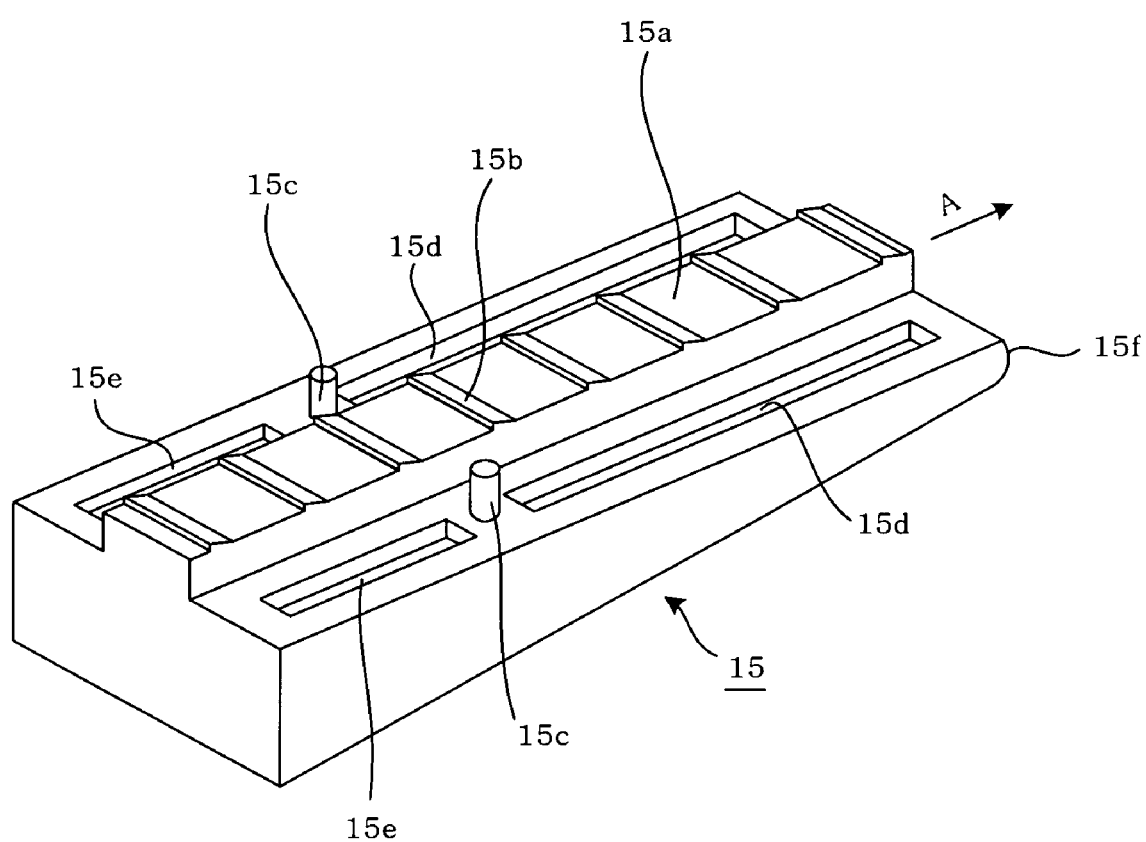
FIG. 15 is a perspective view of the lower surface side of the second wedge-shaped member that constitutes the spacer.
Figure 16:
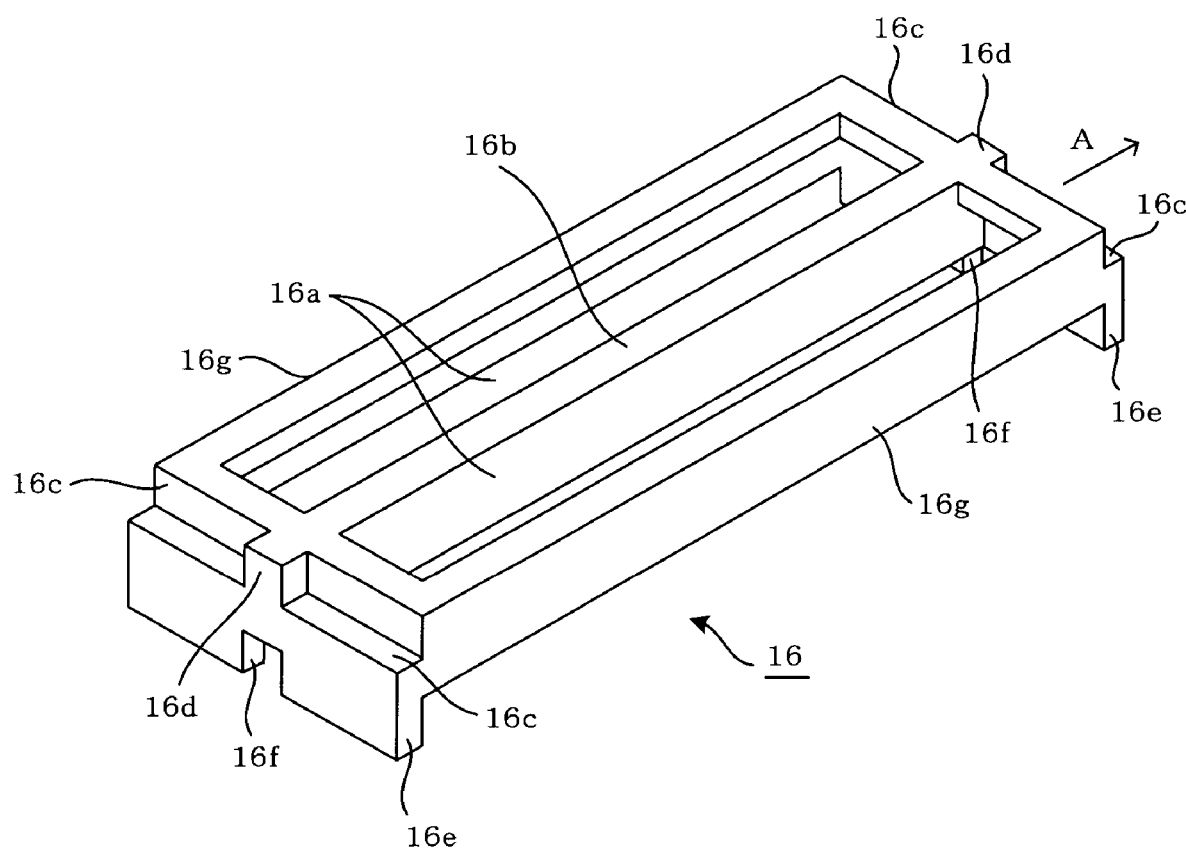
FIG. 16 is a perspective view of the raising member that constitutes the spacer.
Figure 17:
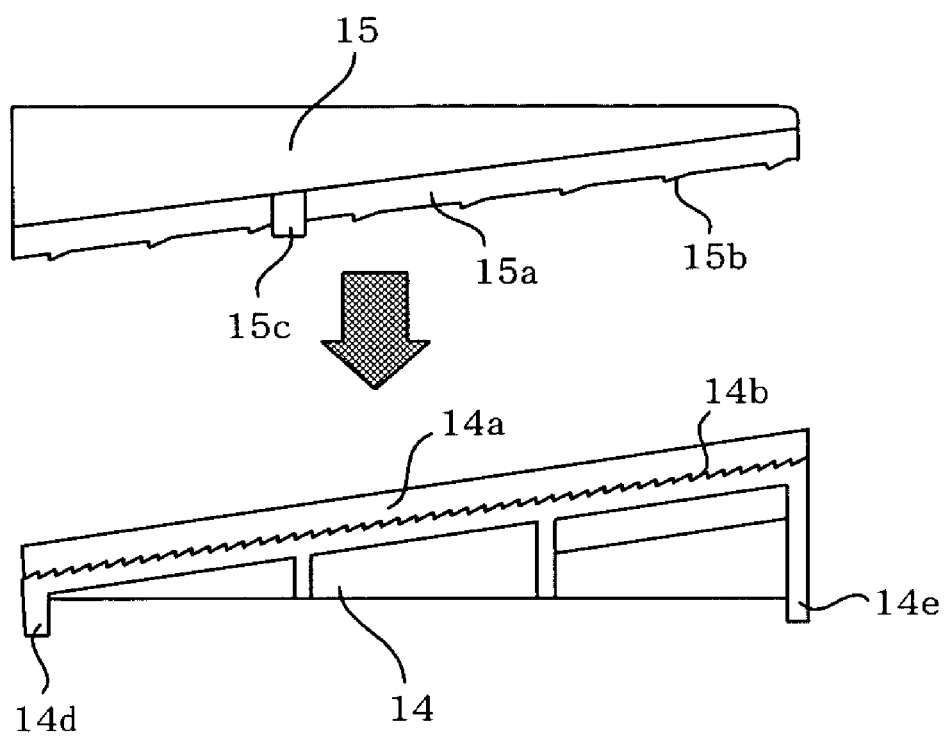
FIG. 17 is an explanatory diagram that shows an aspect wherein the first and second wedge-shaped members overlap.
Figure 20:
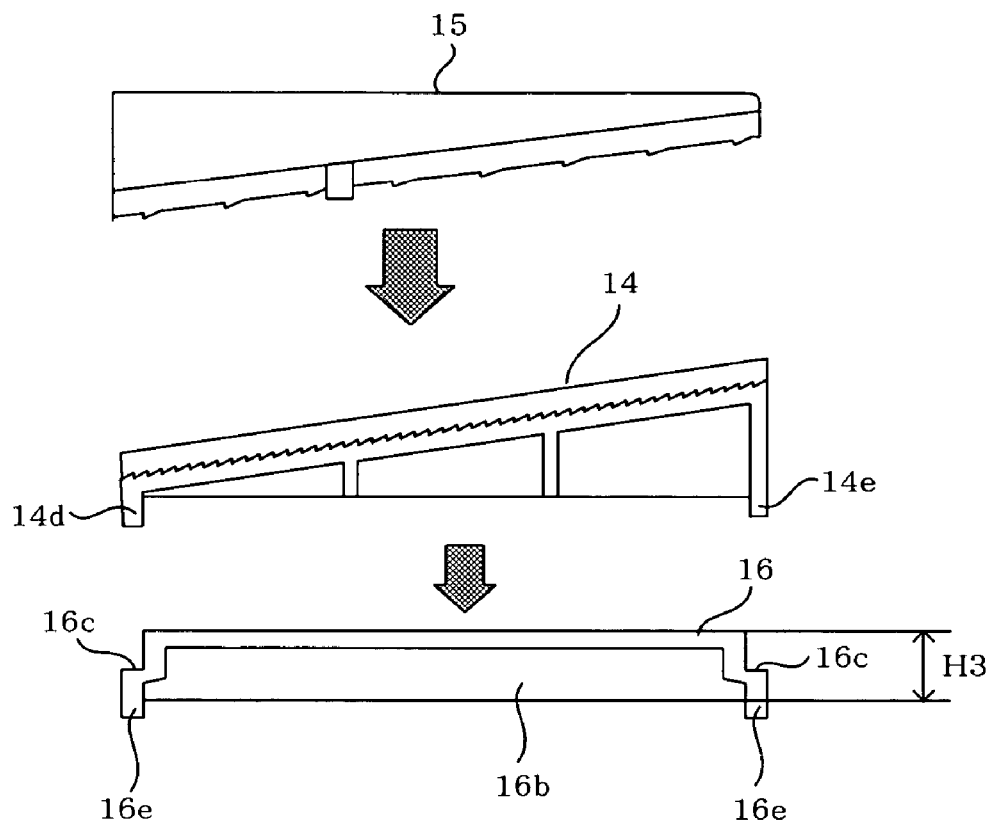
FIG. 20 is an explanatory diagram that shows an aspect wherein the first and second wedge-shaped members and the raising member overlap.
Figure 21:
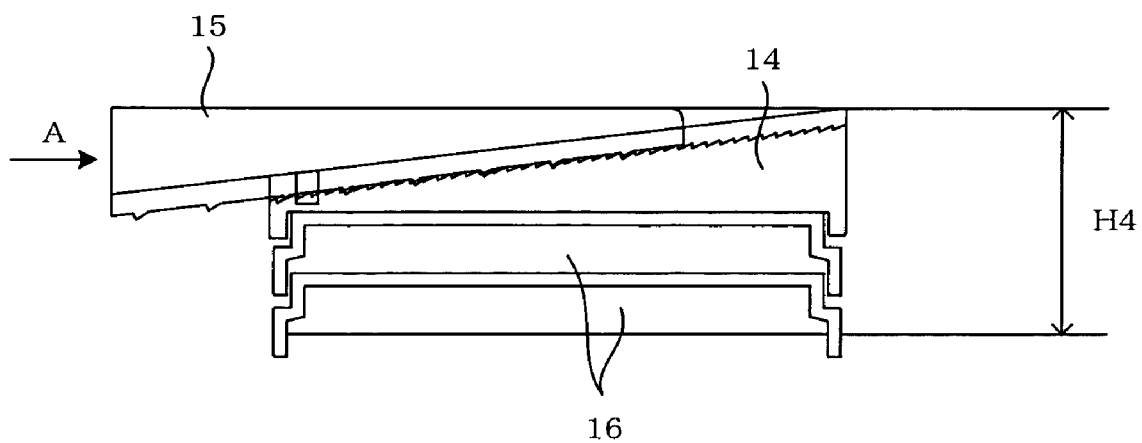
FIG. 21 is an explanatory diagram that shows a state wherein the first and second wedge-shaped members and two raising members overlap.

The spacer 13 comprises a first wedge-shaped member 14, of which the upper surface side is shown in FIG. 14, and a second wedge-shaped member 15, of which the lower surface side is shown in FIG. 15. Both the members 14 and 15 are constructed to vertically overlap, as shown in FIG. 17 and FIG. 18. Furthermore, if the height of the spacer is insufficient, then it comprises a raising member 16, of which the upper surface side is shown in FIG. 16, overlapping below thereof, as shown in FIG. 20 and FIG. 21. The arrow A in FIG. 14 through FIG. 16, FIG. 19 and FIG. 21 indicates the spacer insertion direction, and the spacer 13 is inserted in the direction A between the outer periphery of the rehabilitating pipe 3 and the inner wall surface of the existing pipe 4. Furthermore, these members 14, 15 and 16 are formed as plastic molded products or metal molded products.

The entire external shape of the first wedge-shaped member 14 shown in FIG. 14 is substantially wedge-shaped, and is inclined at a gradual prescribed angle somewhat less than 10 degrees, for example, so that the upper surface is low on the near side and becomes higher on the far side in the spacer insertion direction A. The first wedge-shaped member 14 has at the center part a guide groove 14a of a prescribed width that extends in the longitudinal direction and on the bottom surface thereof numerous teeth 14b are formed in a serrated shape along the inclined direction at a short prescribed pitch of, for example, approximately several millimeters. The cross-sectional shape of each tooth 14b is triangular; and the triangle side formed on the far side in the insertion direction of the wedge-shaped member 14 is substantially perpendicular with respect to the insertion direction, and the triangle side formed on the near side is inclined (refer to FIG. 17 and FIG. 18).

In addition, the wedge-shaped member 14 has two long holes 14c that extend linearly in the longitudinal direction along the guide groove 14a, and has two feet 14d and 14e at the lower end part with a notch 14f formed at the center part (the notch of the foot 14e is not shown).

The entire external shape of the second wedge-shaped member 15, of which the lower surface side is shown in FIG. 15, is substantially wedge-shaped with length and width the same as those of the first wedge-shaped member 14. The lower surface is inclined with respect to the longitudinal direction of the wedge-shaped member 15 at an angle substantially the same as the upper surface of the first wedge-shaped member 14, and is inclined so that the near side is low and the far side becomes higher in the spacer insertion direction. However, the wedge-shaped member 15 is shown in FIG. 15 upside down with the lower surface exposed, so that the orientation is shown in FIG. 15 inverted.

The wedge-shaped member 15 has at the center part a protruding part 15a that extends linearly in the longitudinal direction with a plurality of teeth 15b formed thereon at a large pitch (e.g., approximately 10 to 20 mm) at integer multiples of the pitch of the teeth 14b of the first wedge-shaped member 14. The cross-sectional shape of each tooth 15b is a triangle corresponding to each tooth 14b, but in the reverse orientation. The triangle side formed on the far side in the insertion direction of the wedge-shaped member 15 is inclined with respect to the insertion direction, and the triangle side formed by the near side is substantially perpendicular. Furthermore, the width of the protruding part 15a is slightly less than that of the guide groove 14a of the first wedge-shaped member 14. In addition, the height (projection amount) of the protruding part 15a corresponds to the depth of the guide groove 14a.

In addition, at the bottom surface of the wedge-shaped member 15, two short cylindrical-shaped projections 15c are respectively formed on both sides of the protruding part 15a. Long holes 15d and 15e extend in the longitudinal direction before and after this projection 15c. In addition, the wedge-shaped member 15 is rounded at the tip part 15f thereof.

The overall external shape of the raising member 16 depicted in FIG. 16 is a substantially rectangular frame shape, having a length and width the same as those of the wedge-shaped members 14 and 15, and an upper surface thereof is horizontal with respect to the longitudinal direction. Furthermore, the longitudinal direction is symmetrical with respect to the latitudinal direction, and either of the longitudinal directions may serve as the spacer insertion direction. A wall 16g having a prescribed height H3 (refer to FIG. 20) is formed on both sides of the raising member 16 along the longitudinal direction. In addition, two large rectangular holes 16a are formed on the upper surface of the raising member 16 extending in the longitudinal direction, and a partition wall 16b is formed therebetween having height H3 the same as the walls 16g on both sides. In addition, on both end parts of the upper surface in the longitudinal direction, a step 16c is formed on both sides in the latitudinal direction, and a protruding part 16d is formed therebetween. In addition, a foot 16e is formed at the bottom end part of both end parts, respectively, of the raising member 16 in the longitudinal direction, and a notched part 16f is formed at the center part in the latitudinal direction thereof.

If the spacer comprises only the first and second wedge-shaped members 14 and 15, then the protruding part 15a of the second wedge-shaped member 15 is fitted to the guide groove 14a of the first wedge-shaped member 14, the respective projections 15c are inserted into the respective long holes 14c, and, as shown in FIG. 17 and FIG. 18, the lower surface of the wedge-shaped member 15 overlaps the upper surface of the wedge-shaped member 14. The protruding part 15a is slidably fitted to the groove 14a in the longitudinal direction thereof. By this fitting, the wedge-shaped members 14 and 15 are aligned in the longitudinal direction and their positions in the latitudinal direction are also aligned, thereby preventing the wedge-shaped member 15 from slipping in the latitudinal direction, or dropping.

If the wedge-shaped member 14 and the wedge-shaped member 15 are mutually overlapping in such a manner, the teeth 15b respectively engage with any of the numerous teeth 14b of the wedge-shaped member 14. However, if the wedge-shaped member 15 is pressed in the insertion direction, as shown by the arrow A in FIG. 18b, then the teeth 15b ride over the teeth 14b due to the shape of the mutually engaged teeth 14b and 15b. This causes them to disengage and enables the wedge-shaped member 15 to move toward the wedge-shaped member 14 in the insertion direction. Furthermore, the movement of the wedge-shaped member 15 in the insertion direction is guided via the guide groove 14a and the protruding part 15a. In addition, the range of motion thereof is limited to the range from the position at which the projection 15c of the wedge-shaped member 15 contacts the end edge on the near side of the long hole 14c of the wedge-shaped member 14 in the insertion direction (hereinbelow, referred to as the minimum position) to the position at which it contacts the end edge on the far side in the insertion direction (hereinbelow, referred to as the maximum position).

As mentioned above, the wedge-shaped member 15 is movable in the insertion direction; however, in the state wherein the teeth 14b and 15b are engaged, the teeth 15b get caught on and latched to the teeth 14b due to the shape of the teeth 14b and 15b, even if the wedge-shaped member 15 is pulled in a direction the reverse of the insertion direction, and consequently cannot be moved with respect to the wedge-shaped member 14 in a direction the opposite of the insertion direction.

Based on the above structure, it is possible, by pressing the wedge-shaped member 15 in the insertion direction, to move it with respect to the wedge-shaped member 14 from the minimum position to the maximum position successively at a pitch corresponding to the pitch of the teeth 14b and latch it at latched positions so that it cannot move in the insertion direction or in the reverse direction. Thus, by mutually engaging the teeth of the first and second wedge-shaped members, a latching means is obtained that latches the first and second wedge-shaped members at a plurality of latch positions, thus achieving different spacer heights at each latch position.

Figure 18A:
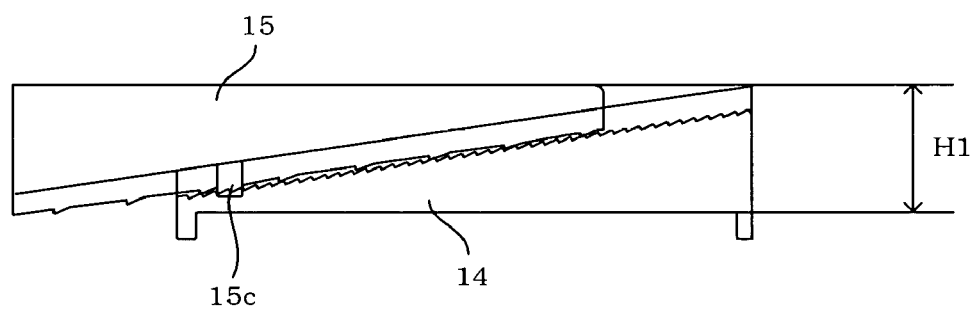
FIG. 18*a* is an explanatory diagram that shows the minimum position of the spacer in the overlapped state.
Figure 18B:
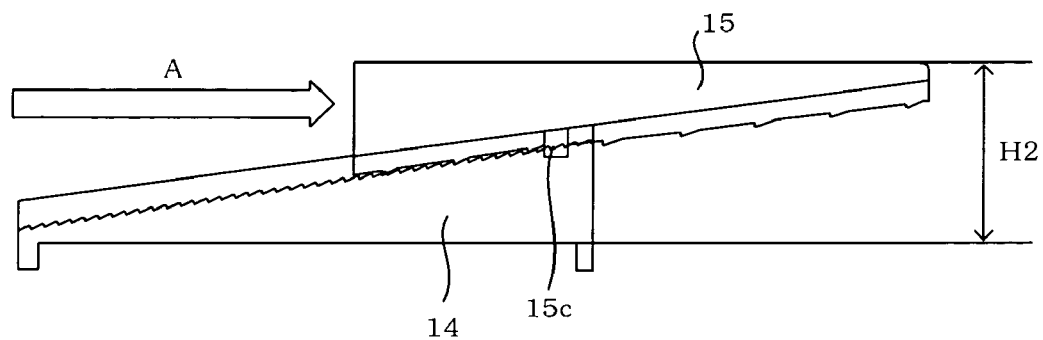
FIG. 18*b* is an explanatory diagram that shows the maximum position of the spacer in the overlapped state.

FIG. 18a shows the minimum position of the wedge-shaped member 15, and FIG. 18b shows the state at the maximum position. In the minimum position state, the total height of the wedge-shaped members 14 and 15 (overall height of the spacer comprising the pair) is the minimum height indicated by a symbol H1; further, the more the wedge-shaped member 15 moves in the insertion direction, the higher the wedge-shaped member 15 climbs along the inclined upper surface of the wedge-shaped member 14, and the higher the total height consequently becomes; it reaches the maximum height indicated by a symbol H2 at the maximum position. By successively moving the wedge-shaped member 15 from the minimum position to the maximum position at a pitch corresponding to the pitch of the teeth 14b, the total height of the wedge-shaped members 14 and 15 can be set stepwise to a desired height from a minimum height H1 to a maximum height H2 at a small-height pitch (e.g., a pitch smaller than 1 mm).

Figure 19:
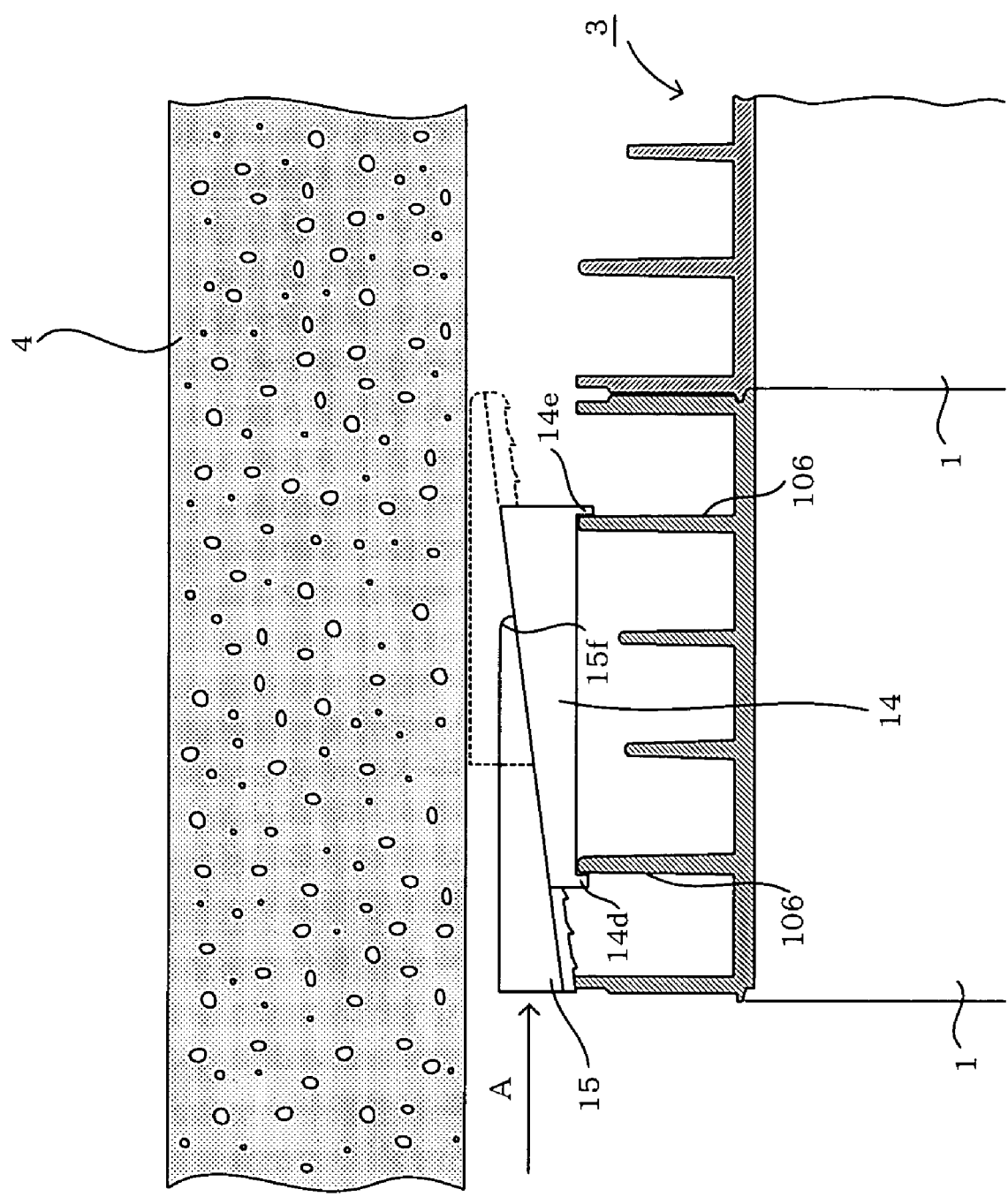
FIG. 19 is an explanatory diagram that shows an aspect wherein the position of the rehabilitating pipe is adjusted by the spacer.

When a spacer of just the wedge-shaped members 14 and 15 is used to adjust the position of the rehabilitating pipe 3, the wedge-shaped member 14 is set, as shown in FIG. 19, so that the feet 14d and 14e thereof are engaged to the two reinforcing plates 106 of the segment 1. The wedge-shaped member 15 is then inserted at the minimum position in the gap between the inner wall surface of the existing pipe 4 and the outer periphery of the rehabilitating pipe 3 to set the wedge-shaped members 14 and 15 on the outer periphery of the rehabilitating pipe 3. Further, by pressing the wedge-shaped member 15 in the insertion direction indicated by the arrow A to move it in the insertion direction with respect to the wedge-shaped member 14, the total height of the wedge-shaped members 14 and 15, i.e., the overall height of the spacer, is successively increased in steps at an extremely small pitch, as discussed earlier, and the position can thereby be adjusted by moving it to a position at which the height becomes the desired height, e.g., as indicated by the broken line, corresponding to the size of the desired gap.

Furthermore, because the upper side of a tip 15f of the wedge-shaped member 15 is rounded, the tip 15f does not get caught on the inner wall surface of the existing pipe 4, and the wedge-shaped member 15 can therefore be moved smoothly. In addition, the upper surface of the wedge-shaped member 14 and the lower surface of the wedge-shaped member 15 are inclined at the same angle and the upper surface of the wedge-shaped member 15 is horizontal. This enables the spacer to stably contact the inner wall surface of the existing pipe 4 and stably interpose the gap between the inner wall surface of the existing pipe 4 and the outer periphery of the rehabilitating pipe 3. Furthermore, the dimensional relationship of the feet 14d and 14e of the wedge-shaped member 14 is set in advance so that the two reinforcing plates 106 engage therewith without any play.

Thus, the position of the rehabilitating pipe 3 can be adjusted by the spacer comprising the wedge-shaped members 14 and 15; however, if the dimension of the abovementioned gap attempted to be set by the spacer is greater than the overall height dimension H2 at the maximum position of the wedge-shaped members 14 and 15, then one raising member 16, as shown in FIG. 20, or a plurality of raising members 16, as shown in FIG. 21, overlaps below the wedge-shaped member 14 in accordance with the dimension of that insufficient portion.

At this time, the wedge-shaped member 14 is brought to overlap on the raising member 16 by respectively engaging the feet 14d and 14e on both end parts of the wedge-shaped member 14 and the notched part 14f thereof with the step 16c and the protruding part 16d on both end parts of the raising member 16. The wedge-shaped member 14 thus does not slip down from the raising member 16 in the longitudinal direction or the latitudinal direction.

In addition, if a plurality of raising members 16 overlap, then, by engaging and overlapping the feet 16e on both end parts of the upper raising member 16 and the notched part 16f thereof with the step 16c and the protruding part 16d on both end parts of the lower raising member 16, the upper raising member 16 does not slip down from the lower raising member 16.

In addition, the walls 16g on both sides and the lower surface of the partition wall 16b of the upper raising member 16 contact the walls 16g on both sides and the upper surface of the partition wall 16b of the lower raising member 16, and are supported on the lower raising member 16. Accordingly, if overlapping a plurality of raising members 16, the overall height H4 of the spacer, as shown in FIG. 21, can be made higher for every overlapping of the raising member 16 by the height H3 of the partition wall 16b and the walls 16g on both sides, as shown in FIG. 20.

The overall height of the spacer can be successively increased stepwise to a desired height and the position of the rehabilitating pipe 3 can be adjusted by setting the spacer comprising overlapped wedge-shaped members 14 and 15 and the raising member 16 on the outer periphery of the rehabilitating pipe 3; and pressing the wedge-shaped member 15 to move it toward the wedge-shaped member 14 in the insertion direction, the same as the case of the spacer comprising just the wedge-shaped members 14 and 15, discussed earlier.

While laying the rehabilitating pipe 3, position adjustment by the above type of spacer is performed at approximately every one meter for a plurality of pipe units 2. When the laying and position adjustment of the overall length of the rehabilitating pipe 3 is completed, supports (not shown) are installed vertically at the top and bottom and horizontally at the left and right at intervals of approximately several meters inside the rehabilitating pipe 3 in order to prevent deformation of the rehabilitating pipe 3 during filling the filler. Subsequently, as shown in FIG. 13, a filler 12 is filled into the space of the gap between the inner wall surface of the existing pipe 4 and the outer perimeter of the rehabilitating pipe 3, and into the space on the outer side of the inner plate 101 of the segment 1 of the rehabilitating pipe 3.

The filler 12 comprises a resin mortar principally comprising cement mortar, epoxy resin, or polyester resin, and the like. The filling thereof is performed by forming a hole 1a approximately every few meters of the length of the rehabilitating pipe 3 at an appropriate position of the upper side segment 1, connecting a filling hose 11 thereto, and pouring the filler 12 from that hose 11. Furthermore, before this filling, the gap between the outer periphery on both ends of the overall length of the assembled rehabilitating pipe 3 and the inner wall surface of the existing pipe 4 is plugged with a sealing material comprising a resin putty or a mortar, and the like (not shown).

Furthermore, the filler 12 also flows into the holes 14c, 15d, 15e, 16a and the like of the spacer and cavities are therefore not formed in the spacer.

After filling of the filler 12 is completed, the filler 12 solidifies and hardens, after which the holes 1a are plugged with sealing material, the supports (not shown) are removed, etc., thus completing the existing pipe rehabilitating work.

According to the embodiment as described above, position adjustment can be performed by increasing the overall height of the spacer to a desired height and the position of the rehabilitating pipe 3 can be adjusted very simply and in a short time period by the extremely simple procedure. In addition, there is no need to fabricate a screw hole for a bolt, as in the case of the conventional spacer, and therefore there is no need for a special procedure, such as plugging a screw hole in a downstream process. Furthermore, there is no need to prepare many types of spacers having differing heights as with conventional spacers, and position adjustment can be performed appropriately for differing gap dimensions with just the preparation of three types of members.

Furthermore, in the structure of the spacer in the embodiment discussed above, it is also acceptable to vertically reverse the first and second wedge-shaped members 14 and 15, to remove the feet 14d, 14e of the member 14 and make it the second wedge-shaped member, and attach feet to the member 15 to make it the first wedge-shaped member.

In addition, the surface of the second wedge-shaped member 15 facing the existing pipe is planar and not inclined; strictly speaking, when inserted in the gap between the existing pipe and the rehabilitating pipe, the inner circumferential surface of the existing pipe does not make surface contact, and therefore it is also acceptable to make the surface opposing the existing pipe curved in the circumferential direction, and to make the curved surface have a curvature the same as the inner circumferential surface of the existing pipe to further enhance surface contact. In addition, the pitch in the inclined direction of the teeth 14b of the first wedge-shaped member 14 differs from the pitch in the inclined direction of the teeth 15b of the second wedge-shaped member 15, but may also be made the same pitch.

Furthermore, the position adjusting spacer and the position adjusting method utilizing such according to the present invention is not limited to the adjustment of the position of a rehabilitating pipe in existing pipe rehabilitating work, but naturally can be broadly used in position adjustment wherein a spacer is inserted in a gap between a fixed object and an object whose position is to be adjusted.

What is claimed is:

1. A spacer inserted in a gap between an existing pipe and a rehabilitating pipe to adjust the position of the rehabilitating pipe with respect to the existing pipe, comprising:
    a first wedge-shaped member having a surface inclined at a prescribed angle;
    a second wedge-shaped member having a surface inclined at an angle the same as the inclination angle of the first wedge-shaped member, the inclined surface of the second wedge-shaped member being aligned with and overlapping the inclined surface of the first wedge-shaped member; and
    latching means for making the second wedge-shaped member movable toward the first wedge-shaped member in an insertion direction and for latching the members to each other at any of a plurality of latch positions to avoid movement of the members in a reverse direction opposite the insertion direction;
    wherein the second wedge-shaped member is successively movable to one of the latch positions to stepwise increase an overall height of the spacer;
    the inclined surface of one of the wedge-shaped members includes a linear groove, and the inclined surface of the other wedge-shaped member includes a linear protrusion that slidably engages with said groove in an inclined-line direction to enable movement of the second wedge-shaped member in the insertion direction relative to the first wedge-shaped member; and
    the first and second wedge-shaped members include teeth formed in said linear groove or in said linear protrusion.

2. A spacer according to claim 1, wherein:
    the teeth are formed at a prescribed pitch in the inclined surface of the first wedge-shaped member;
    teeth that engage with the teeth of the first wedge-shaped member are formed in the inclined surface of the second wedge-shaped member at a pitch the same as or different from said prescribed pitch; and
    said latching means comprises mutual engagement of the teeth of the first and second wedge-shaped members.

3. A spacer according to claim 1, wherein:
    the inclined surface of said first wedge-shaped member or the inclined surface of the second wedge-shaped member defines a linearly extended hole; and
    the inclined surface of the other wedge-shaped member includes a projection that is inserted in said linearly extended hole; and
    a range of movement of the second wedge-shaped member toward the first wedge-shaped member in said insertion direction is controlled via said linearly extended hole and the projection.

4. A spacer according to claim 1, further comprising a foot that engages with a rehabilitating pipe, the foot being formed at a lower end part on both end parts of said first wedge-shaped member.

5. A spacer according to claim 1, further comprising a raising member at the bottom of said first wedge-shaped member for raising the overall height of the spacer.

6. A spacer according to claim 5, wherein said raising member further comprises a first engaging part that engages said first wedge-shaped member as said first wedge-shaped member overlaps an upper side of the raising member, and a second engaging part that engages a second raising member as said second raising member overlaps a lower side of the first raising member.

* * * * *